United States Patent
Youngberg et al.

(10) Patent No.: US 7,048,001 B2
(45) Date of Patent: May 23, 2006

(54) PRESSURE REGULATOR WITH SINGLE STRUT REGULATOR SEAT

(75) Inventors: Michael Youngberg, Walla Walla, WA (US); Cliff Ungerecht, Walla Walla, WA (US); Barton R. Nelson, Walla Walla, WA (US)

(73) Assignee: Nelson Irrigation Corporation, Walla Walla, WA (US)

(*) Notice: Subject to any disclaimer, the term of this patent is extended or adjusted under 35 U.S.C. 154(b) by 95 days.

(21) Appl. No.: 10/822,683

(22) Filed: Apr. 13, 2004

(65) Prior Publication Data

US 2005/0224117 A1    Oct. 13, 2005

(51) Int. Cl.
  *G05D 16/08*    (2006.01)
  *F16K 1/42*    (2006.01)

(52) U.S. Cl. ................ 137/505.25; 137/505.28; 251/359

(58) Field of Classification Search .......... 137/505.25, 137/505.28, 219, 220; 251/359
  See application file for complete search history.

(56) References Cited

U.S. PATENT DOCUMENTS

| | | | |
|---|---|---|---|
| 796,959 A * | 8/1905 | Croslen | 137/505.28 |
| 1,441,784 A * | 1/1923 | Clayton | 137/219 |
| 3,654,950 A * | 4/1972 | Hamm | 137/219 |
| 3,750,693 A * | 8/1973 | Hardison | 137/219 |
| 4,116,212 A * | 9/1978 | Cooper | 137/508 |
| 4,209,485 A | 6/1980 | Greenspan | |
| 5,257,646 A | 11/1993 | Meyer | |
| 5,875,815 A | 3/1999 | Ungerecht et al. | |
| 5,881,757 A | 3/1999 | Kuster et al. | |
| 5,931,445 A | 8/1999 | Dvorak et al. | |
| 6,374,853 B1 | 4/2002 | Callies | |
| 2004/0003848 A1 | 1/2004 | Callies | |

* cited by examiner

*Primary Examiner*—Stephen M. Hepperle
(74) *Attorney, Agent, or Firm*—Nixon & Vanderhye P.C.

(57) ABSTRACT

A fluid pressure regulator comprising a tubular housing having a fluid inlet at one end thereof and a fluid outlet at an opposite end and a fluid passage therebetween; a tubular plunger mounted for reciprocal movement in the fluid passage, the plunger having a flow control end and a piston end; a seat in the fluid passage including a seating surface located axially upstream of the plunger and adapted to be approached or engaged by a lower edge of the flow control end of the plunger, the seat supported centrally within the fluid passage by a single radially-oriented strut.

11 Claims, 5 Drawing Sheets

FLOW DIRECTION

FLOW DIRECTION

PRESSURE REGULATOR WITH SINGLE STRUT REGULATOR SEAT

BACKGROUND OF THE INVENTION

This invention relates to valves and pressure regulators generally, and specifically to a fluid (water) pressure regulator, particularly suited for (but not limited to) use in agricultural irrigation systems.

It is well known to use pressure regulators in irrigation systems in order to provide constant, regulated outlet pressure over a wide range of regulator inlet pressures, to thereby insure the supply of water is maintained at a uniform pressure to a sprinkler or other irrigation device. The need for such regulators is particularly acute in low pressure systems because even slight variations in pressure along a system operating at low pressure causes much greater variations and discharges than the same system operating at high pressure.

The assignee of this invention currently manufactures and sells fluid pressure regulators of the flow-through type, having an inlet at one end of a tubular housing and an outlet at the other end of the tubular housing. A valve or regulator seat is fixed within the housing and is adapted to be engaged by a tubular plunger which is spring biased away from the seat (in the direction of fluid flow) so that under normal conditions, maximum flow through the regulator is permitted. In the event of a pressure surge, the plunger is moved by back pressure within a diaphragm chamber, against the action of an opposed coil spring (and against atmospheric pressure), toward the regulator seat to thereby decrease flow through the regulator until the pressure is reduced, at which point the plunger will stop or, if pressure decreases sufficiently, move upwardly away from the seat to thereby increase the flow. In this way, the regulator constantly seeks an equilibrium position to maintain a uniform outlet pressure. The typical arrangement where the regulator or valve seat is located in the center of the flowpath, supported by multiple (e.g., four) radial struts or spokes, is problematic however, especially in dirty water conditions. Specifically, fibrous debris such as grass tends to hairpin about the radial struts and obstruct the flowpath, decreasing the operational performance characteristics of the regulator. Multiple struts also increase pressure loss through the regulator.

BRIEF DESCRIPTION OF THE INVENTION

In accordance with one exemplary embodiment of the invention, the pressure regulator or valve seat is comprised of a circular disc supported concentrically within a center opening of an annular support ring that also corresponds to a center portion of the flowpath or fluid passage. In order to minimize the hairpinning problem experienced with prior pressure regulators, the circular disc is supported within the center opening of the support ring by a single radially extending strut. In one embodiment, the underside of the strut has a rounded V-shape along its underside, with the majority of the strut located below or axially upstream of the seat. In a second embodiment, the underside of the strut is sloped upwardly from its radially outer end to its radially inner end to even further reduce the possibility of fibrous material hairpinning and remaining on the strut.

Accordingly, in one aspect, the present invention relates to a fluid pressure regulator comprising a tubular housing having a fluid inlet at one end thereof and a fluid outlet at an opposite end and a fluid passage therebetween; a tubular plunger mounted for reciprocal movement in the fluid passage, the plunger having a flow control end and a piston end; a seat in the fluid passage including a seating surface located axially upstream of the plunger and adapted to be approached or engaged by a lower edge of the flow control end of the plunger, the seat supported centrally within the fluid passage by a single radially-oriented strut.

In another aspect, the invention relates to a valve seat for a valve or pressure regulator comprising an annular support ring defining a central flow opening and a disc having a seating surface supported concentrically within the center opening by a single radially-oriented strut.

In still another aspect, the invention relates to a valve seat for a valve or pressure regulator comprising an annular support ring defining a central flow opening and a disc having a seating surface supported concentrically within the center opening by a single radial strut connected to an underside of the disc; wherein the seating surface is surrounded by an upstanding peripheral flange; and further wherein the underside of the strut is formed with an underside that slopes in a downstream direction from a radially outer end thereof to a radially inner end thereof.

The invention will now be described in detail in connection with the drawings identified below.

DETAILED DESCRIPTION OF THE INVENTION

Figure 1:
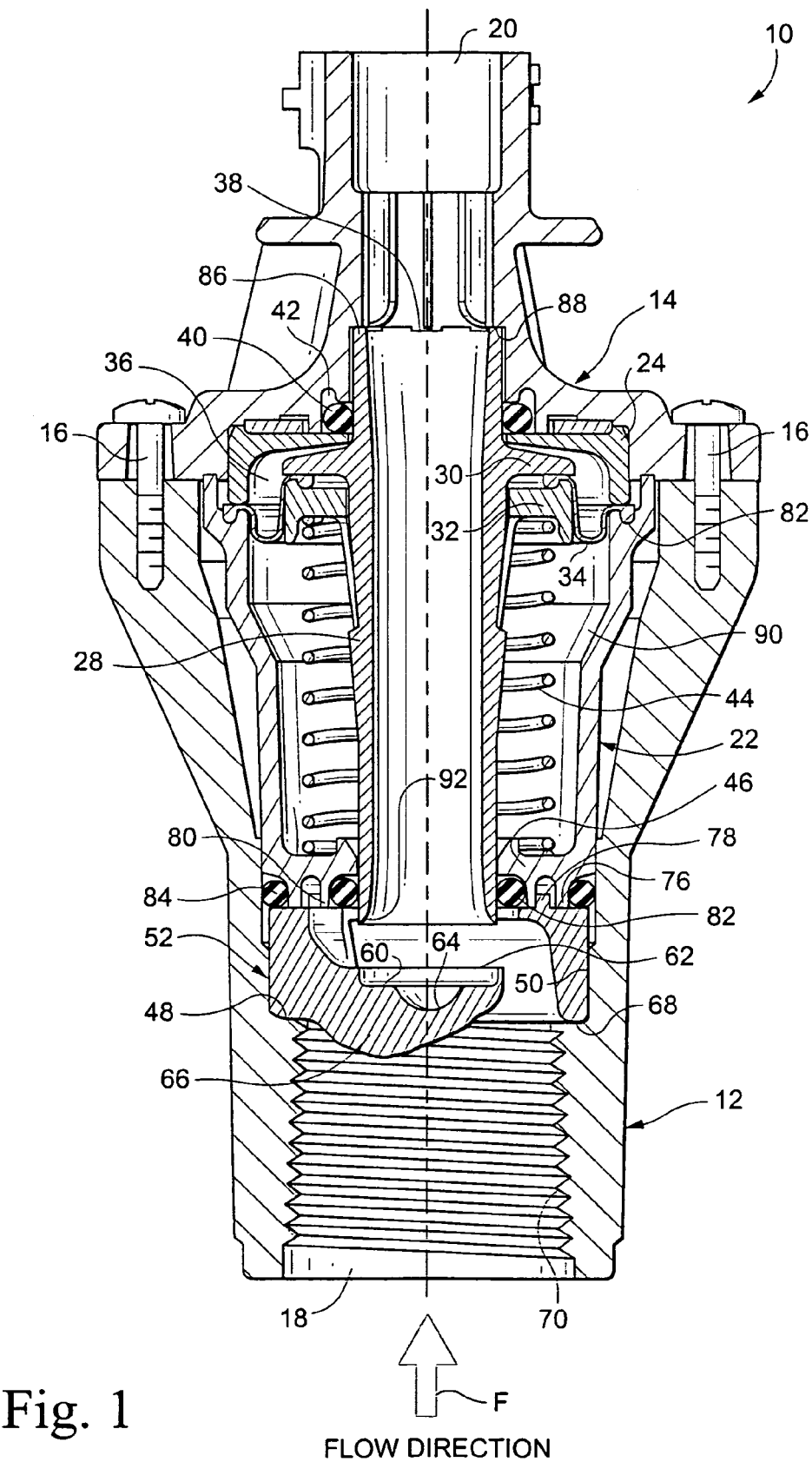
FIG. 1 is a cross section through a pressure regulator in accordance with an exemplary embodiment of the invention.
Figure 2:
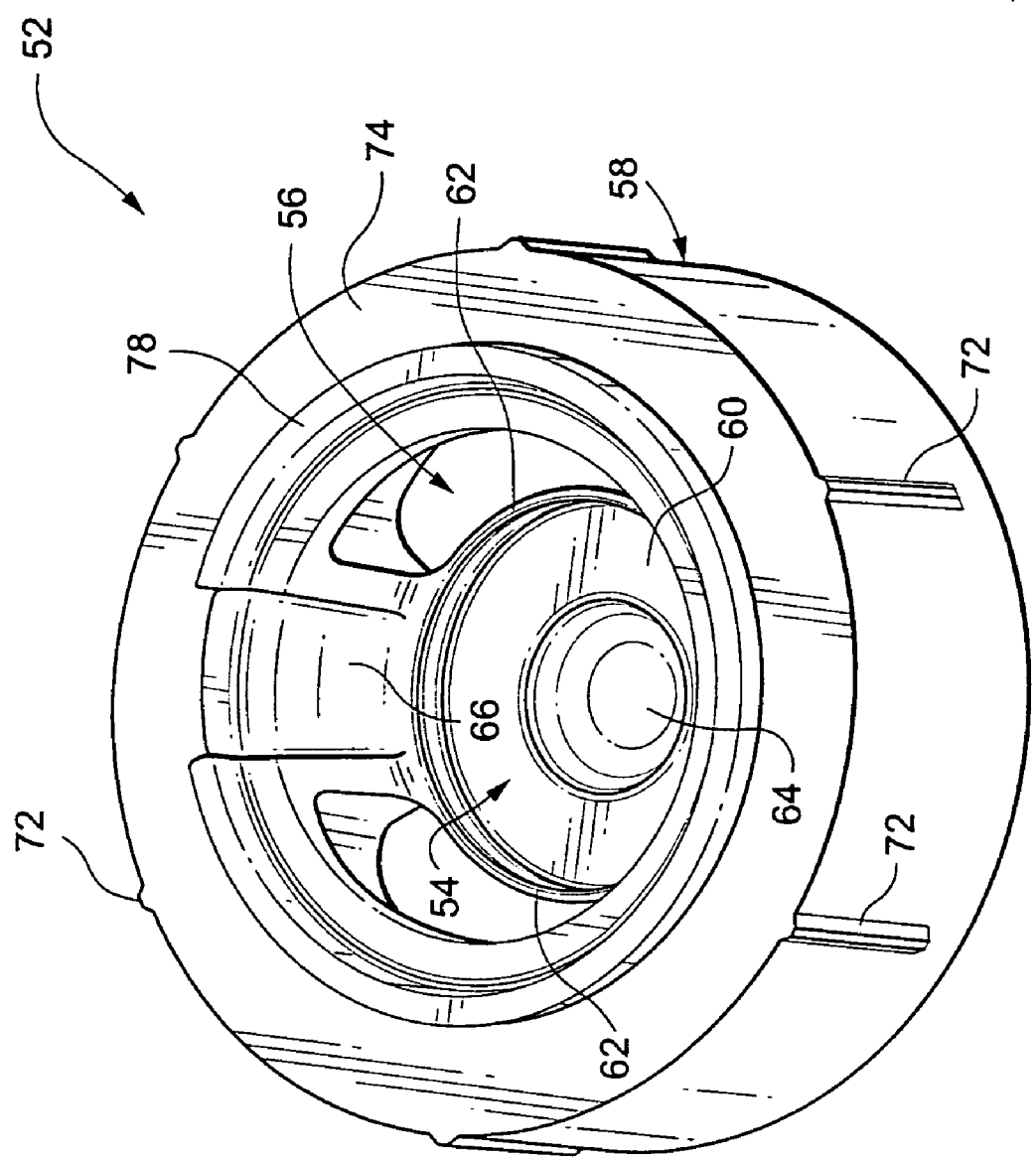
FIG. 2 is a perspective view of a pressure regulator seat removed from the pressure regulator shown in FIG. 1.
Figure 3:
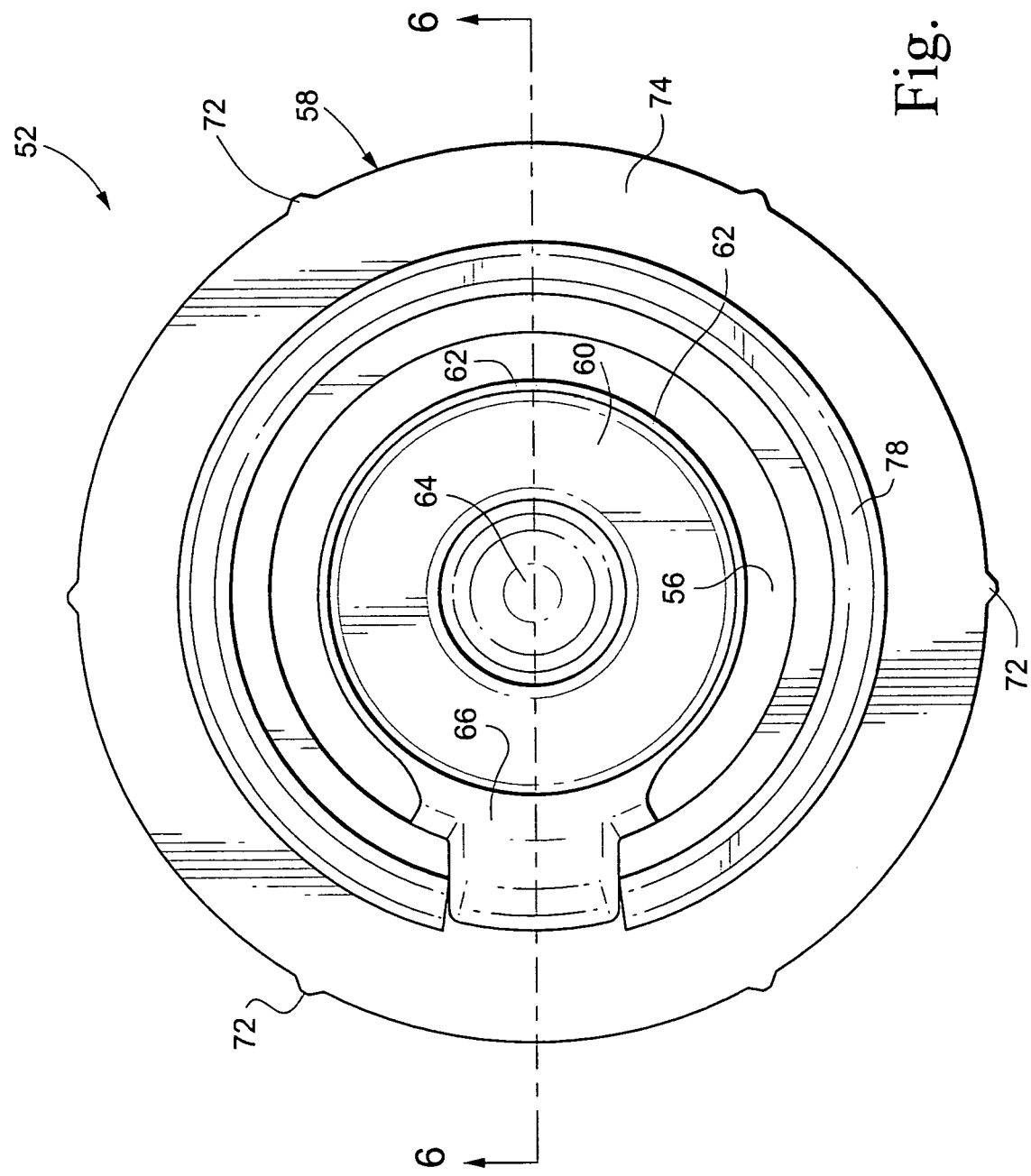
FIG. 3 is a plan view of the pressure regulator seat shown in FIG. 2.

With reference to FIGS. 1–3, a fluid pressure regulator 10 in accordance with an exemplary embodiment of this invention includes a tubular housing including an inlet section 12 and an outlet section 14 secured together by means of fasteners such as screws 16. The pressure regulator 10 is of the flow-through type, with an inlet 18 provided at one end of inlet housing section 12, and an outlet 20 provided at the distal end of the outlet housing section 14. It will further be appreciated that the inlet 18 of the regulator may be threaded internally or externally in any of a number of thread configurations and sized to facilitate attachment to variously sized hoses or other conduits. The outlet 20 is shown to be externally threaded (but could be interiorly threaded), and is adapted to receive in a typical arrangement, a rotary impact type sprinkler, a fixed spray head, or other sprinkler device.

In the following description, any reference to "upper" or "lower" is based on the orientation of the pressure regulator as shown in FIG. 1 and is not intended to in any way limit the scope of the invention.

A tubular sleeve 22 is located within the inlet section 12, with a cap 24 substantially closing the upper open end of the sleeve 22. The lower end 26 of the sleeve and the cap 24 are each formed with axially aligned center openings that permit a piston or plunger 28 to move axially back and forth within the openings. The piston or plunger 28 is provided with a radial piston flange 30 nearer the upper end of the plunger, with a disc-like spring retainer 32 located adjacent and upstream (in a flow direction) of the piston flange 30. A flexible diaphragm 34 extends radially between the housing and the piston or plunger. Specifically, the radially outer end of the diaphragm is clamped between the upper end of sleeve 22 and the lower end of the cap 24, and the radially inner end of the diaphragm is clamped between the spring retainer 32 and the piston flange 30. This arrangement creates a pressure or diaphragm chamber 36 between the diaphragm 34 and the cap 24 that is subject to regulator outlet pressure via a path from a series of cut-outs 38 in the upper end of sleeve 22, along the piston or plunger 28, and past an O-ring 40 located in an annular recess 42 in the outlet housing section 14.

A coil spring 44 is arranged within the sleeve 22 and surrounds the plunger 28. The spring 44 extends axially between the radially-oriented bottom wall 46 of the sleeve 22 and the spring retainer 32, thus biasing the plunger 28 in an upward or maximum flow direction.

Within the inlet section 12 of the regulator housing, and adjacent the inlet 18, there is formed an annular shoulder 48 and an adjacent cylindrical surface 50. These surfaces are designed to receive a replaceable, plastic valve or regulator seat 52.

Figure 4:
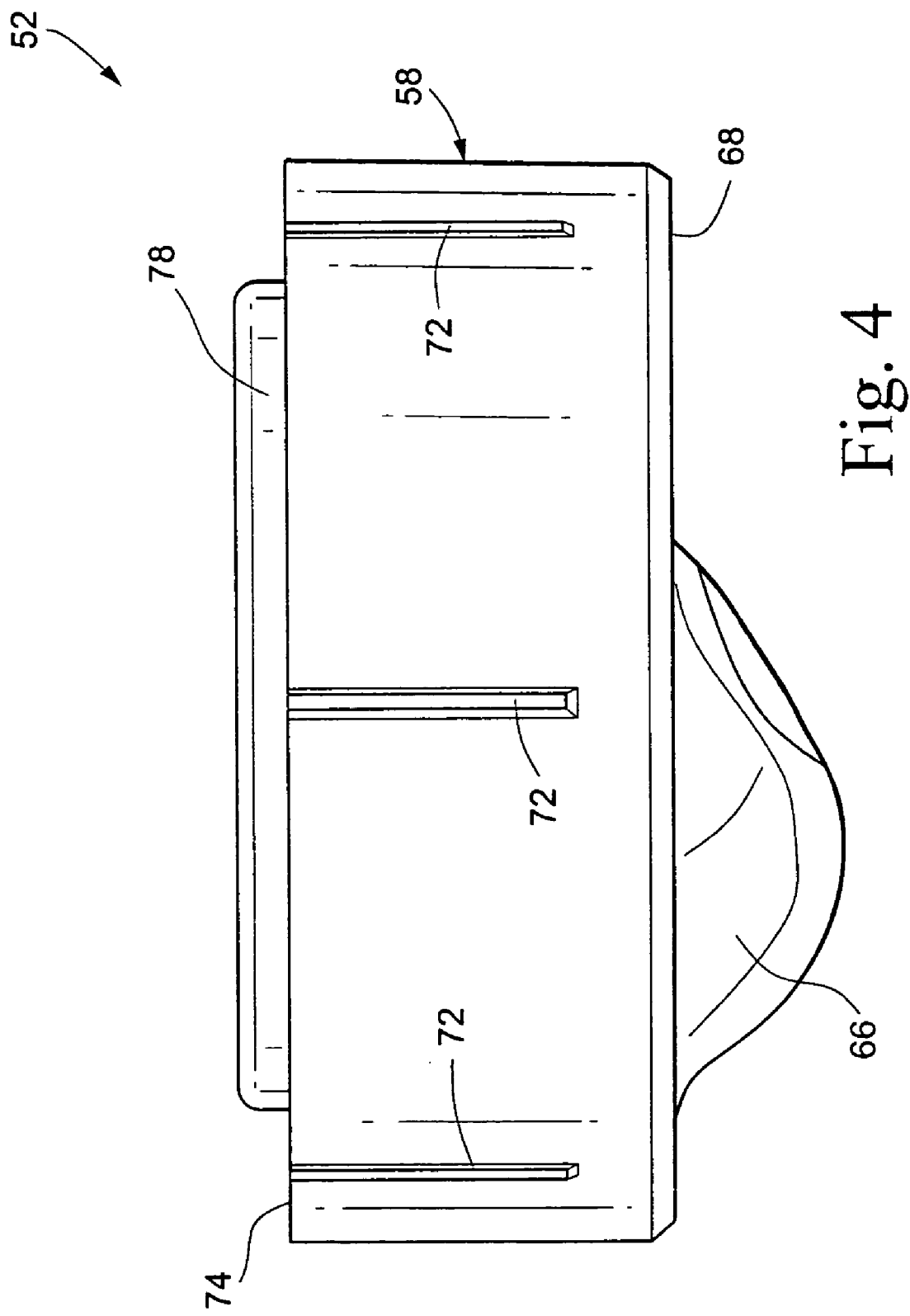
FIG. 4 is a side elevation of the pressure regulator seat shown in FIG. 2.

The regulator seat 52, best seen in FIGS. 2–4, comprises a circular disc 54 supported concentrically within a center opening 56 of an annular support ring 58. More specifically, the circular disc 54 includes a substantially flat, annular seating surface 60 substantially surrounded by an upstanding peripheral annular flange or wall 62. The center of the disc 54 is formed with a blind recess 64 in the molding process. A single, radially-oriented support strut 66 extends from the underside of recess 64 (i.e., approximately centered relative to the seat 52) radially outwardly to the annular support ring 58. FIGS. 1 and 4 clearly illustrate the rounded V-shaped profile of the underside of the strut 66.

The annular support ring 58 is formed with a flat annular surface 68 on its underside that seats on the annular horizontal shoulder 48 located adjacent the internal thread 70 at the inlet 18. Circumferentially spaced vertical ribs 72 reduce friction between the annular support ring 58 and the housing surface 50, facilitating removal and/or replacement of the seat if needed. A flat upper surface 74 of the support ring 58 is engaged by the lower edge of an annular wall 76 on the sleeve 22. An annular rib 78 on upper surface 74 of the seat 52 locates the sleeve vis-à-vis the support ring 58 in that rib 78 is received between the wall 76 and a concentric radially inner wall 80 also formed on the lower edge of the sleeve 22.

By supporting the seat 52 in this manner, it can be appreciated that surface area dedicated to supporting the seat within the center of the regulator flowpath or fluid passage has been kept to a minimum. As best seen in FIG. 4, there is an open flowpath of about 340° around the seat, significantly reducing the potential for obstruction, and also minimizing pressure loss through the regulator.

Seat 52 is preferably formed of a rigid plastic material, for example, a glass fiber reinforced polyphenylene sulfide (PPS) resin. Preferably, the material has a minimum flexural modulus of 1.8 Msi (ASTM D790).

For one size regulator, the seat 52 may have an outside diameter of 0.494 inch and the support ring 58 may have an inner diameter of 0.669 inch. The outer diameter of the support ring 58 may be 1.135 inch and the height may be 0.400 inch. Of course, the dimensions may change for different size regulators.

Returning to FIG. 1, adjacent the annular walls 76 and 80, there are seated a pair of inner and outer O-rings 82, 84, respectively, which insure that fluid flowing through the regulator, in the direction from inlet 18 to outlet 20 as indicated by the flow arrow F, is constrained to flow through the reciprocable plunger 28 and around the seat 52 as described below.

Note that the cap 24 is held securely in place within a counterbore formed in the housing outlet section 14 so that, upon assembly of the upper housing section 14 to the lower housing inlet section 12, the sleeve 22, cap 24 and seat 52 are firmly clamped and thus fixed within the housing.

The upper end of the regulator plunger 28 (above the piston flange 30) slides or reciprocates within the center opening of the sleeve cap 24. The outer peripheral surface engages O-ring 40 as it reciprocates within the housing, and the upper end of the plunger 28 terminates at a free, downstream end 86 that is adapted to engage an annular shoulder 88 provided in the upper housing section 14, thus providing a stop for upward or opening movement of the plunger 28.

In use, fluid flows through the regulator from inlet 18 around the seat 52 and through the plunger 28 and outlet 20. Under normal flow pressure conditions, the plunger 28 is biased upwardly as viewed in FIG. 1 so that the flow through the regulator is maximized. In the event of a pressure build-up within the line or device downstream of the outlet 20, water pressure in chamber 36 will increase, causing the plunger 28 to move in an upstream direction toward the seat surface 60. The diaphragm 34 maintains an effective fluid-tight seal so that no fluid enters the chamber 90 between the plunger 28 and the sleeve 22 in which the spring 44 is located. Chamber 90 is, however, vented to atmosphere by a plurality of notches or grooves (not shown), and, therefore, pressure exerted on piston flange 30 must not only overcome spring 44, but atmospheric pressure as well.

Depending upon the amount of back pressure developed within the regulator 10, the plunger 28 may move downwardly so that the tapered annular edge 92 approaches the surface 60 to reduce flow through the regulator, or under extreme pressure conditions, seats on surface 60 to thereby prevent flow through the regulator. Upon a subsequent decrease in back pressure, the spring 44, along with atmospheric pressure, will serve to overcome whatever back pressure is present to thereby move the plunger 28 upwardly toward the outlet 20, thereby opening the fluid flow passage between the plunger 28 and the seat 52. In this way, the plunger or piston 28 continuously seeks an equilibrium position, insuring uniform pressure at the outlet 20.

Figure 5:
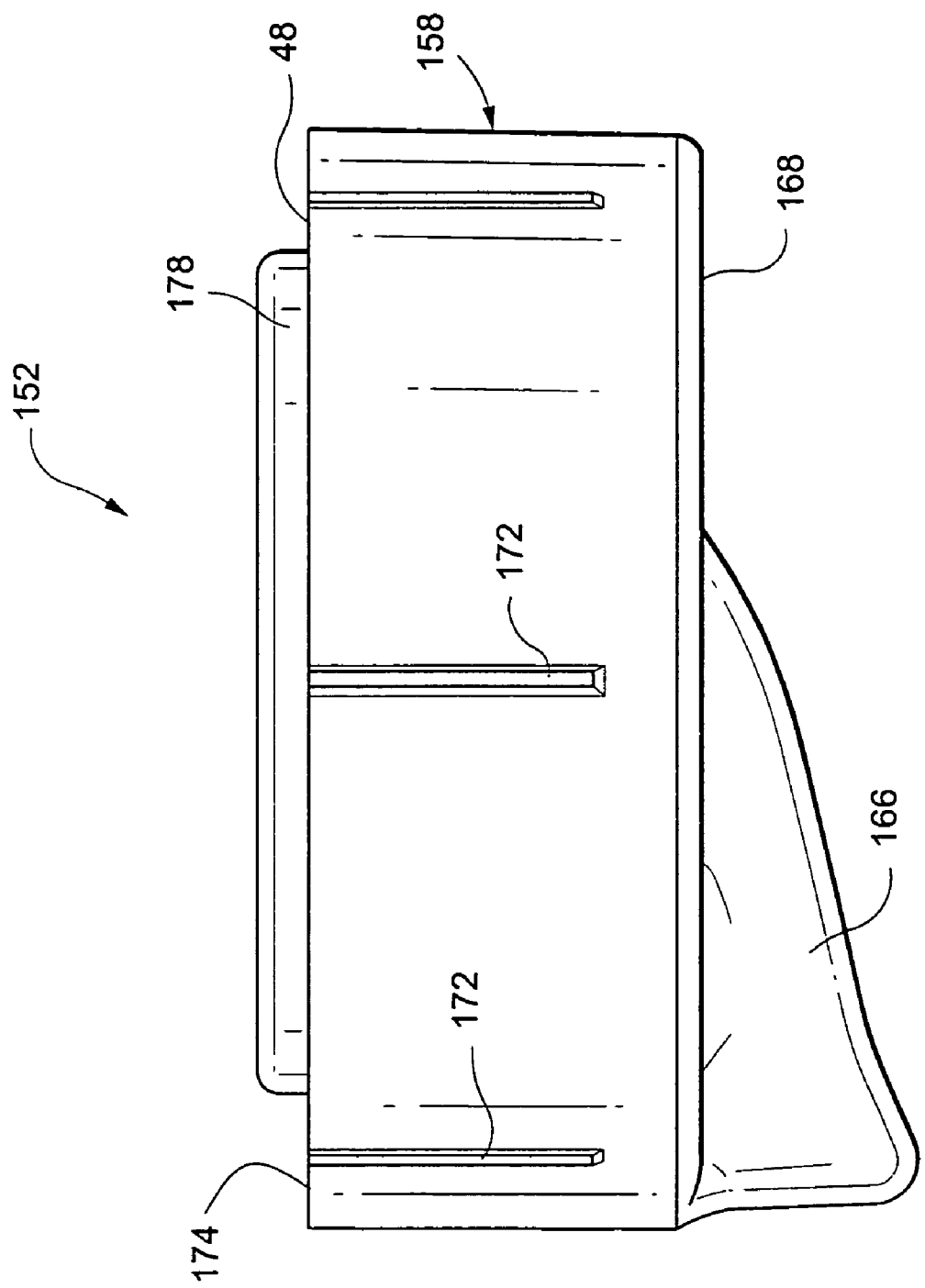
FIG. 5 is a side elevation of a pressure regulator seat in accordance with a second embodiment of the invention.

With reference now to FIG. 5, an alternative seat 152 is similar to seat 52 and, as such, similar reference numerals, but with the prefix "1" added, are used to designate corresponding parts of the seat. The shape of strut 166 has been altered so that its underside (i.e., the surface exposed to the inlet flow) slopes upwardly, i.e., in a downstream direction, from its radially outer end to its radially inner end. The sloped surface further assists in preventing hairpinning of fibrous debris in that the fibrous material is likely to slide along the strut and be carried away by the flow of water through the regulator. To accommodate the reconfigured strut 166, an axial slot (not shown) must be provided in the housing section 12, extending partially through the thread 70 (FIG. 1).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fluid pressure regulator comprising:
   a tubular housing having a fluid inlet at one end thereof and a fluid outlet at an opposite end and a fluid passage therebetween;
   tubular plunger mounted for reciprocal movement in said fluid passage, said plunger having a flow control end and a piston end;
   a seat in said fluid passage including a seating surface located axially upstream of said plunger and adapted to be approached or engaged by an upstream edge of said flow control end of said plunger, said seat supported centrally within said fluid passage by a single radially-oriented strut extending between said seat and an annular support ring supported in said tubular housing adjacent said fluid inlet, said strut projecting upstream of an upstream face of said annular support ring.

2. The fluid pressure regulator of claim 1 wherein said seating surface is surrounded by an upstanding peripheral flange.

3. The fluid pressure regulator of claim 1 wherein said piston end has a piston surface and a flexible diaphragm extending radially between said piston surface and said housing.

4. The fluid pressure regulator of claim 1 wherein said seat is comprised of a glass fiber reinforced resin material with a flexural modulus of at least 1.8 Msi.

5. The fluid pressure regulator of claim 4 wherein said glass fiber reinforced polyphenylene sulfide resin.

6. The fluid pressure regulator of claim 1 wherein said single radially-oriented strut connects to an underside of said seat.

7. A fluid pressure regulator comprising:
   a tubular housing having a fluid inlet at one end thereof and a fluid outlet at an opposite end and a fluid passage therebetween;
   tubular plunger mounted for reciprocal movement in said fluid passage, said plunger having a flow control end and a piston end;
   a seat in said fluid passage including a seating surface located axially upstream of said plunger and adapted to be approached or engaged by an upstream edge of said flow control end of said plunger, said seat supported centrally within said fluid passage by a single radially-oriented strut; and
   wherein said single, radially-oriented strut has a rounded V-shaped upstream side.

8. A fluid pressure regulator comprising:
   a tubular housing having a fluid inlet at one end thereof and a fluid outlet at an opposite end and a fluid passage therebetween;
   tubular plunger mounted for reciprocal movement in said fluid passage, said plunger having a flow control end and a piston end;
   a seat in said fluid passage including a seating surface located axially upstream of said plunger and adapted to be approached or engaged by an upstream edge of said flow control end of said plunger, said seat supported centrally within said fluid passage by a single radially-oriented strut; and
   wherein said single, radially-oriented strut is formed with an underside that slopes in a downstream direction from a radially outer end thereof to a radially inner end thereof.

9. The fluid pressure regulator of claim 1 wherein said annular support ring has a flat downstream; surface with an annular rib formed thereon.

10. A fluid pressure regulator comprising:
    a tubular housing having a fluid inlet at one end thereof and a fluid outlet at an opposite end and a fluid passage therebetween;
    tubular plunger mounted for reciprocal movement in said fluid passage, said plunger having a flow control end and a piston end;
    a seat in said fluid passage including a seating surface located axially upstream of said plunger and adapted to be approached or engaged by an upstream edge of said flow control end of said plunger, said seat supported centrally within said fluid passage by a single radially-oriented strut; and
    wherein said annular support ring has a flat downstream surface with an annular rib formed thereon.

11. A fluid pressure regulator comprising:
    a tubular housing having a fluid inlet at one end thereof and a fluid outlet at an opposite end and a fluid passage therebetween;
    tubular plunger mounted for reciprocal movement in said fluid passage, said plunger having a flow control end and a piston end;
    a seat in said fluid passage including a seating surface located axially upstream of said plunger and adapted to be approached or engaged by an upstream edge of said flow control end of said plunger, said seat supported centrally within said fluid passage by a single radially-oriented strut;
    wherein said seat is comprised of a glass fiber reinforced polyphenylene sulfide resin material with a flexural modulus of at least 1.8 Msi.

* * * * *